United States Patent
Forzoni et al.

(10) Patent No.: US 10,043,272 B2
(45) Date of Patent: Aug. 7, 2018

(54) METHOD AND APPARATUS FOR ACQUIRING AND FUSING ULTRASOUND IMAGES WITH PRE-ACQUIRED IMAGES

(71) Applicants: Leonardo Forzoni, Pistoia (IT); Stefano De Beni, Genoa (IT); Sara D'Onofrio, Novara (IT); Lorenzo Bessi, Florence (IT)

(72) Inventors: Leonardo Forzoni, Pistoia (IT); Stefano De Beni, Genoa (IT); Sara D'Onofrio, Novara (IT); Lorenzo Bessi, Florence (IT)

(73) Assignee: Esaote S.p.A., Genoa (IT)

( * ) Notice: Subject to any disclaimer, the term of this patent is extended or adjusted under 35 U.S.C. 154(b) by 136 days.

(21) Appl. No.: 14/854,421

(22) Filed: Sep. 15, 2015

(65) Prior Publication Data
US 2016/0078623 A1    Mar. 17, 2016

(30) Foreign Application Priority Data
Sep. 16, 2014  (IT) .............................. GE2014A0092

(51) Int. Cl.
*G06T 7/38*    (2017.01)
*G06T 7/00*    (2017.01)
(Continued)

(52) U.S. Cl.
CPC .............. *G06T 7/0016* (2013.01); *G06T 7/33* (2017.01); *G06T 7/38* (2017.01); *G06T 11/003* (2013.01);
(Continued)

(58) Field of Classification Search
CPC ........... G06T 7/0016; G06T 7/38; G06T 7/33; qjG06T 11/60; G06T 11/003;
(Continued)

(56) References Cited

U.S. PATENT DOCUMENTS

2002/0128550 A1*  9/2002  Van Den Brink ....... A61B 8/00
                                                     600/411
2006/0004275 A1*  1/2006  Vija ......................... A61B 6/00
                                                     600/407
(Continued)

FOREIGN PATENT DOCUMENTS

WO         2014064066         5/2014

OTHER PUBLICATIONS

Reinertsen, Ingerid, Frank Lindseth, Geirmund Unsgaard, and D. Louis Collins. "Clinical validation of vessel-based registration for correction of brain-shift." Medical image analysis 11, No. 6 (2007): 673-684.*

(Continued)

*Primary Examiner* — Carol Wang
(74) *Attorney, Agent, or Firm* — Themis Law

(57) ABSTRACT

A method of fusing ultrasound images with pre-acquired images includes acquiring a first 3D ultrasound image in real-time; identifying at least one known reference pattern or object within a pre-acquired 3D image and the 3D ultrasound image; registering the real-time 3D ultrasound image with the pre-acquired 3D image by using the reference pattern or object; fusing the 3D ultrasound images of a sequence of real-time 3D ultrasound images; with the pre-acquired 3D image using data of the co-registration; and displaying fusion tomographic images, each including the corresponding real-time ultrasound image and the pre-acquired image. The registration between real-time 3D ultrasound images and the pre-acquired 3D image is performed continuously in the background by continuing to acquire the real-time 3D ultrasound images and to register them with the pre-acquired 3D images using the reference pattern or patterns or the object or objects.

11 Claims, 4 Drawing Sheets

(51) Int. Cl.
  *G06T 11/60* (2006.01)
  *G06T 11/00* (2006.01)
  *G06T 7/33* (2017.01)
(52) U.S. Cl.
  CPC .... *G06T 11/60* (2013.01); *G06T 2207/10016* (2013.01); *G06T 2207/10088* (2013.01); *G06T 2207/10136* (2013.01); *G06T 2207/20221* (2013.01); *G06T 2207/30016* (2013.01); *G06T 2207/30044* (2013.01); *G06T 2207/30101* (2013.01)
(58) Field of Classification Search
  CPC . G06T 2207/10016; G06T 2207/30044; G06T 2207/20221; G06T 2207/10088; G06T 2207/30101; G06T 2207/10136; G06T 2207/30016; A61B 5/7425; A61B 6/5247; A61B 6/4417; A61B 8/4416; A61B 8/5261; A61B 8/5238
  See application file for complete search history.

(56) References Cited

U.S. PATENT DOCUMENTS

| | | | | |
|---|---|---|---|---|
| 2006/0020204 | A1* | 1/2006 | Serra | A61B 8/0833 600/437 |
| 2008/0085042 | A1* | 4/2008 | Trofimov | A61B 5/042 382/128 |
| 2009/0097723 | A1* | 4/2009 | Washburn | A61B 8/06 382/128 |
| 2009/0326363 | A1* | 12/2009 | Li | A61B 8/12 600/411 |
| 2011/0178389 | A1 | 7/2011 | Kumar | |
| 2012/0071749 | A1* | 3/2012 | Xu | A61B 6/5247 600/411 |
| 2015/0018666 | A1* | 1/2015 | Madabhushi | A61B 8/12 600/411 |

OTHER PUBLICATIONS

Huang, Xishi, Nicholas A. Hill, Jing Ren, Gerard Guiraudon, Derek Boughner, and Terry M. Peters. "Dynamic 3D ultrasound and MR image registration of the beating heart." In International Conference on Medical Image Computing and Computer-Assisted Intervention, pp. 171-178. Springer, Berlin, Heidelberg, 2005.*

Kuklisova-Murgasova, Maria, Amalia Cifor, Raffaele Napolitano, Aris Papageorghiou, Gerardine Quaghebeur, Mary A. Rutherford, Joseph V. Hajnal, J. Alison Noble, and Julia A. Schnabel. "Registration of 3D fetal neurosonography and MRI." Medical image analysis 17, No. 8 (2013): 1137-1150.*

Kuklisova-Murgasova, Maria, Gerardine Quaghebeur, Joseph V. Hajnal, J. Alison Noble, and Julia A. Schnabel. "Towards 3D registration of fetal brain MRI and ultrasound." In Biomedical Imaging (ISBI), 2012 9th IEEE International Symposium on, pp. 346-349. IEEE, 2012.*

Laurent J. Salomon et al: "MRI and ultrasound fusion imaging for prenatal diagnosis", American Journal of Obstetrics and Gynecology, vol. 209, No. 2, Aug. 1, 2013 (Aug. 1, 2013), pp. 148.e1-148. e9, XP055190056, ISSN: 0002-9378, DOI: 10.1016/j.ajog.2013.05. 031 * p. 148.el-p. 148.e3 * * figures 1,4 *, *Table 2*.

Brasseur-Daudruy M et al: "Fusion echographie-IRM : une nouvelle approche du cerveau foetal", Gynecologie Obstetrique & Fertilite, vol. 42, No. 5, Apr. 29, 2014 (Apr. 29, 2014) * pp. 365-368, XP028664598, ISSN: 1297-9589, DOI: 10.1016/J.GYOBFE.2014. 03.004 * the whole document *.

Nadine Abi-Jaoudeh et al: "Multimodality Image Fusion-Guided Procedures: Technique, Accuracy, and Applications", Cardiovascular and Interventional Radiology, Springer-Verlag, NE, vol. 35, No. 5, Aug. 1, 2012 (Aug. 1, 2012) * pp. 986-998, XP035115016, ISSN: 1432-086X, DOI: 10.1007/S00270-012-0446-5 * the whole document *.

* cited by examiner

METHOD AND APPARATUS FOR ACQUIRING AND FUSING ULTRASOUND IMAGES WITH PRE-ACQUIRED IMAGES

FIELD OF THE INVENTION

The present invention relates to a method for the acquisition of ultrasound images and for the fusion of such images with pre-acquired 3D images, comprising the following steps:

acquisition of a first 3D ultrasound image in real-time;

identification of at least one known reference pattern or object within the pre-acquired 3D image and the 3D ultrasound image;

co-registration of the 3D ultrasound image acquired in real-time with the pre-acquired 3D image by using the reference pattern or object;

fusion of the 3D ultrasound images of a sequence of 3D ultrasound images acquired in real-time with the pre-acquired 3D image by using data of the co-registration between said first 3D ultrasound image and the pre-acquired 3D image;

display of fusion tomographic images, each fusion image comprising the corresponding ultrasound image acquired in real-time and the pre-acquired image.

BACKGROUND OF THE INVENTION

Methods of this type are currently known and used and are able to perform a fusion of pre-acquired images with real-time ultrasound images. Typically, these methods have a multimodal approach, such to combine the advantages of ultrasound acquisition with the advantages of other acquisition modalities, such as for example magnetic resonance imaging (MRI) or computerized axial tomography (CT).

Such technologies perform a fusion of highly detailed morphological information for example of MRI, with morphologic and above all hemodynamic information of ultrasound acquisition, for example by Color or Power Doppler modality.

Ultrasound imaging has some advantages with respect to MRI: it is safe and relatively inexpensive; the technology is widely available; it enables real-time imaging, with anatomical or morphological information (obtained by B-Mode imaging) and hemodynamic information (obtained by Color Doppler or Power Doppler technologies); it offers a good spatial resolution; it allows anatomical or vascular anomalies to be assessed.

On the other hand, ultrasound imaging is dependent on the ultrasound operator and on the radiologist who interprets the obtained images, it provides a small field of view, the resolution is reduced in case of bone tissue.

MRI has some advantages with respect to ultrasounds, such as a greater detail and contrast, a larger field of view, but at the same time it is more expensive and often it is not readily available.

In the light of such reasons, it is clear that multimodal fusion methods are gaining importance in clinical practice in order to fully exploit the advantages offered by the different modalities.

A more and more important application is the one related to fetal imaging. In such context, ultrasound imaging holds the supremacy as regards diffusion, simplicity and efficacy in use, and currently it is the main screening and diagnostic imaging modality as regards fetal imaging.

However, nowadays the use of MRI for prenatal diagnosis is continuously and considerably increasing. Literature, research papers and everyday clinical practice regarding this topic are constantly increasing. The reasons could be found in a real clinical added value and in the influence that MRI system manufacturers and suppliers are exerting on physicians and clinical institutions.

At the same time it is important to note that many of the malformations hard to be detected in ultrasound imaging relate to brain structures and blood vessels.

Fetal MRI is used, when available, as second imaging modality in case of particular pathologies detected or considered suspected by ultrasound analysis and/or laboratory analysis.

Therefore, in such scenario, it is logical to develop technologies able to fuse together information of the most common diagnostic imaging modality for obstetrics, that is ultrasound imaging (US), able to perform also hemodynamic studies by Color Doppler (CD) and Pulsed Wave Doppler (PW) with advanced diagnostic MRI modalities having a high spatial and contrast resolution and a high signal to noise ratio (SNR).

The fusion of US with MRI allows the operator to have all the advantages of the two modalities in real time, particularly the use of the hemodynamic US analysis, together with the MRI detailed analysis of brain and anatomical structures.

The fetal body district of major interest for the real-time fusion is the fetal head for two main anatomical/clinical reasons:

1. the cerebral structures are contained within the skull and, therefore, they are not affected by movements and/or structure distortions when the fetus moves;

2. the fetal head district can be affected by many pathologies, whose detection is based on minute structure changes and tiny differences with respect to normally developed fetal brain.

For such district therefore there is the need of an early diagnosis for many pathologies, which requires to contemporaneously analyse clinical information of the two imaging modalities.

Since ultrasounds (US) is the main diagnostic modality and since the MRI is used only when it is necessary, US-MRI fusion would be possible only by performing the real-time ultrasound acquisition after the acquisition of the MRI data. Practically speaking, usually after a first screening by ultrasound imaging, the fetal head MRI acquisition is performed and, therefore, the real-time ultrasound acquisition can be performed and the fusion of ultrasound and MRI images can be obtained.

The technologies for the fusion of the highly anatomical definition information of MRI with hemodynamic information of ultrasounds, allow what previously was analysed in two different modalities and time moments to be combined in real-time.

The main limitation of fetal multimodal fusion imaging is fetal movements, which are wide, frequent and independent with respect to the surface the probe rests on, that is the skin of the mother's belly. Fetal movements are highly probable both due to fetus autonomous movements and due to the high mobility of the womb, placenta and the amniotic sac of the mother.

Under such conditions, the currently known methods are not able to obtain satisfactory results, since the correlation of real-time ultrasound images and pre-acquired images obtained after the registration is irreparably lost upon the first considerable fetus movement.

Moreover often the pre-acquired images, for example 3D images acquired by MRI technology, have been acquired in moments different than ultrasound images and these moments can be such that, due to the rapid growth of the fetus, the sizes of the reference patterns or objects for the registration operations are very different and therefore they are difficult or inaccurate. Therefore under such conditions the advantages obtained by the fusion are at least partially compromised.

SUMMARY OF THE INVENTION

The present invention aims at overcoming such drawbacks of the currently known methods by a method such as described hereinbefore, where the registration between 3D ultrasound images acquired in real-time and the pre-acquired 3D image is performed in a continuous manner in background, by continuing to acquire in background the real-time 3D ultrasound images and to register said images with the pre-acquired 3D images by using said reference pattern or patterns or said object or objects.

The volume acquired in background that is the 3D image acquired in background can consider both imaging data and Doppler data, Doppler data meaning ultrasound information obtained by one or more of the following techniques: (Color Doppler, Power Doppler, Color Coded Doppler and by using them individually or combined for the continuous co-registration with the same reference pattern identified in the pre-acquired 3D image, for example by a different imaging modality or technique.

Generally the acquisition of 3D ultrasound images in background means to perform only some steps of the process for transmitting, receiving and processing ultrasound signals to image data and to an ultrasound image displayable on a screen, particularly the steps such as the conversion of image data into a displayable image or reception signals into image data are omitted.

Thus a continuous background registration algorithm is carried out, that allows the correlation of ultrasound images acquired in real-time and pre-acquired image to be kept or to be continuously restored.

Pre-acquired images preferably are MRI images. As an alternative or in combination to MRI however it is possible to use also other acquisition modalities such as US, CT, fluoroangiography, PET, SPECT and the like.

In a preferred embodiment the region of interest is the fetal head.

In one embodiment fusion images are 2D tomographic images and they comprise a view of the real-time image along a predetermined scanning plane and the corresponding view, reconstructed on the basis of the registration, of the pre-acquired image.

Therefore a 3D ultrasound acquisition is performed, with a high frame rate in order to allow a tomographic plane of the body or anatomical district under examination to be displayed, where the images of the fusion of pre-acquired MRI images and ultrasound images along said tomographic plane are displayed, while, in background, the registration algorithm is performed.

The spatial arrangement of the plane displayed on the ultrasound screen with respect to the volume acquired in background for the continuous co-registration is completely free.

In one embodiment the registration is performed by identifying as the reference pattern or object a plurality of markers lying on a registration plane of the real-time image, and by identifying the corresponding markers in the pre-acquired image.

The markers can be of any type, preferably they are known anatomical structures or Color signal or Power Doppler signal of known vessels.

In a preferred embodiment the markers are the blood vessels.

Therefore the method comprises at least one first quick acquisition of a 3D ultrasound image and an automatic registration algorithm operating in background and it is able to perform a fusion on the basis of the blood vessels of the brain shown on the magnetic resonance (usually by using TOF—Time of Flight—acquisition sequences) with hemodynamic information of the brain obtained by 3D Color Doppler (or Power Doppler).

Therefore particularly one embodiment of the method comprises the steps of identifying in the pre-acquired 3D image a volume or section plane comprising the at least one reference pattern or object therein;

acquiring at least one 3D ultrasound image by means of a quick acquisition and identifying inside it the at least one reference pattern or the at least one object;

Performing a registration of the 3D ultrasound images with the pre-acquired 3D images on the basis of said reference pattern or of said object;

defining a plane or a volume corresponding to the view of an object or to an anatomical district to be examined within the 3D ultrasound image acquired in real-time and in the pre-acquired 3D image registered with each other, which plane or volume does not coincide with the volume or section plane containing the reference pattern or object for performing the registration;

continuing with the acquisition of the 3D ultrasound image and the reconstruction of the real-time ultrasound image in said plane or in said volume corresponding to the view of an object or to an anatomical district to be examined and performing the fusion with the corresponding image along said plane or in said volume of the pre-acquired 3D image;

continuing with the acquisition in background of the image data of the 3D ultrasound images and with the use in background of information or data of the 3D ultrasound images acquired in real-time and maintaining the registration between real-time ultrasound images and pre-acquired images by continuing to perform in background the registration process for each 3D ultrasound image acquired in real-time and the pre-acquired 3D image by using the volume or section plane comprising the at least one reference pattern or the at least one object therein.

Therefore 3D real-time images relate to the Color or Power Color signal of the fetal head blood vessels (mainly Circle of Willis and Middle Cerebral Arteries).

In a particularly advantageous embodiment, the markers are the blood vessels composing the Circle of Willis. The Circle of Willis is an arterial anastomosis system easily recognizable and it is composed of the convergence of three main arteries: the basilar artery, in turn composed of the convergence of the vertebral arteries, and of two internal carotid arteries.

Therefore a continuous acquisition of a 3D Color Doppler signal of some selected blood vessels, such as for example the Circle of Willis is performed and the continuous matching with the same blood vessels identified within the 3D MRI pre-acquired image is guaranteed, in order to counteract possible fetus movements and subsequently to maintain the initial MRI-US image registration and to obtain the real-time fusion.

In one embodiment, the method provides an automatic selection of the Circle of Willis in the 3D ultrasound real-time image, by using the Color Doppler signal, and on the MRI volume, where, depending on the performed acquisition sequence, the vessels have a high contrast with respect to the surrounding cerebral structures: such semi-automatic operation contributes in a fine tuning of the registration procedure, in order to speed up the final fusion and to enhance the registration accuracy. The recognition of the structure of interest can be based also on the use, within the algorithm, of the well-known general brain atlases, present both for adult people, children and today also for the fetus.

Once the registration procedure is performed for the first time, the fusion between the two modalities is maintained by means of a continuous automatic registration performed in background. This is due to the fact that the real-time ultrasound acquisition is a continuous and volumetric, that is 3D, acquisition.

The registration by means of its algorithm for the continuous adjustment and check of the matching between the images of the two modalities works by finding the matching of the Color Doppler signal coming from the 3D ultrasound image with MRI information of relevant blood vessels. To this end proper MRI sequences enhancing the contrast resolution between the blood vessels of interest and the surrounding cerebral structures are used (usually TOF).

The tomographic plane used for the registration is preferably, but not necessarily, different from the displayed tomographic plane, that is the plane on which the fusion of the real-time image with the pre-acquired image is displayed.

In order to allow the registration to be performed, the 3D ultrasound probe acquires at a high frame rate, preferably almost double with respect to the display frame rate, and the system is able to process the tomographic view extracted from the 3D data related to the background registration, not shown on screen, and the tomographic view extracted from the 3D data for fusion and display, shown on screen, in real time, with no frame rate reduction with respect to the expected one and with no time delays. In order to maximize the frame-rate, the acquisition has to be performed preferably by a 3D convex array probe.

After the first registration between the two imaging modalities, the matching and synchronization of the US real-time image and the pre-acquired MRI image are continuously kept in real-time. In this case the system in background acquires Color Doppler information of some well visible fetal brain vessels (such as the Circle of Willis) but without displaying them in real time. This enables the continuous matching after the first registration, limiting the computational overload due to system data management and to display.

In one embodiment the registration comprises the assessment and subsequent adaptation of size change of one or more anatomical structures between the moment of the pre-acquired image acquisition and the moment of the real-time image acquisition.

Preferably the anatomical structure is the fetal head.

To this end there is provided a fetal head size adaptation algorithm, which acts on the MRI 3D image, in order to predict a possible fetal growth in the size of the head if a considerable time period has elapsed between the MRI acquisition and the fusion imaging session.

In some periods of the gestation and depending on many other circumstances, the fetal growth can be really fast.

The fetal head size adaptation algorithm intervenes in the automatic and/or semi-automatic continuous registration procedure to obtain a final high spatial precision and correlation. The algorithm can also be used in cases of repeated ultrasound follow up with fusion of images, when the MRI acquisition is not performed, for instance due to a limited availability of MRI systems and due to the higher cost in the MRI diagnostic examination than the ultrasound scanning.

The fetal head size adaptation algorithm can use proper segmentation techniques and size-adaptation rules, for example depending on the trimester, gender, race and growth curve/tendency of the examined fetus and it has to be able to predict the fetus growth between the date of the MRI acquisition and the date of the real-time ultrasound examination with fusion of images.

Thus, the algorithm is able to mitigate the size changes of the fetal head, enhancing the precision of the matching between the two imaging modalities.

The fetal head size adaptation algorithm is able to facilitate both the automatic or semi-automatic registration phase between MRI and US and also the subsequent continuous matching check with continuous registration adaptation, performed in order to maintain the MRI pre-acquired image and the real-time US image always matched, especially considering fetus movements. A size adapted MRI volume is more easily matched to the 3D ultrasound volume acquired in real-time.

According to an improvement the continuous and automatic background registration is performed by acquiring a sequence of 3D ultrasound images in real-time the movements of the reference pattern or object, for the example of the circle of Willis and by applying for the correction a correction of the initial registration for example by means of surface matching or pattern matching techniques.

The advantage of the present invention therefore is to acquire image data of large 3D volumes, it being limited to display 2D images only of the diagnostically significant plane and by using remaining information of the acquired 3D image or a part thereof for performing the registration and maintaining over time the registration between the ultrasound image acquired in real-time and the pre-acquired image.

The processing of fusion and reconstruction of the real image is performed only for the image data comprised in the plane of the diagnostically significant image, while the remaining image data are used only for the registration thus reducing the computational overload and the processing time.

Still according to one improvement, the method according to the present invention and according to one or more of the characteristics described above can be combined with ultrasound image acquisition techniques that use plane wave in the transmission. In this case the advantage is the fact that by means of such techniques information are contemporaneously acquired, namely the B-mode image data and Doppler information from which the reference patterns or objects are identified. Thus dedicated acquisitions are avoided and the frame rate is not reduced, enabling to operate always in a real-time modality.

Such techniques are for example described in U.S. Pat. No. 5,628,320 or U.S. Pat. No. 7,720,708 or in EP 1411495 and are known to the person skilled in the art.

Moreover it has to be noted that the Circle of Willis is an advantageous, but not limitative, example of the marker, or of the object or of the reference pattern to be used for the registration.

By using a segmentation process on pre-acquired image data, for example on MRI image data and by acquiring at least a part of such pattern also by the ultrasound scanning it is possible to use any structure to perform the registration and the matching over time thereof, that is maintaining the conditions of registration between the pre-acquired image and the real-time ultrasound image.

Under these conditions it is possible to perform an imaging of the whole head and to use the bone of the skull for the registration.

The present invention further relates to a device for acquiring and displaying ultrasound images, comprising a probe provided with one or more electroacoustic transducers, a unit transmitting an ultrasonic beam through the transducers within a body under examination, a unit receiving and processing ultrasound signals received from the transducers for generating real-time images, a probe tracking system, and means for the registration of an acquired real-time ultrasound image with a pre-acquired image, for combining the coordinate system of the body under examination, the coordinate system of the probe and the coordinate system of the pre-acquired image into a single coordinate system, and means for displaying a sequence of fusion images, each fusion image comprising the corresponding real-time image and the pre-acquired image, where the registration means operate in real-time for each or some real-time images.

In a preferred embodiment, the ultrasound probe is of the array type.

The array probe enables a high acquisition frame-rate, and therefore it is particularly intended to perform the method described above. However it is possible to provide other types of probe currently known for 3D acquisitions.

It is possible to use electromechanical or CMUT probes.

Registration means are operated upon the acquisition of a real-time 3D US image. The device loads the dataset previously acquired by 3D magnetic resonance and the fusion is performed.

The pre-acquired MRI image is preferably coded in the DICOM format.

BRIEF DESCRIPTION OF THE DRAWINGS

These and other characteristics and advantages of the present invention will be more clear from the following description of some embodiments shown in the annexed drawings wherein.

DETAILED DESCRIPTION OF EMBODIMENTS OF THE INVENTION

The method of the present invention is specifically directed to, but not limited to, monitor the fetal head.

In the text of the present description and in the claims the acronym US stands for the term ultrasound or ultrasonic.

Figure 1:
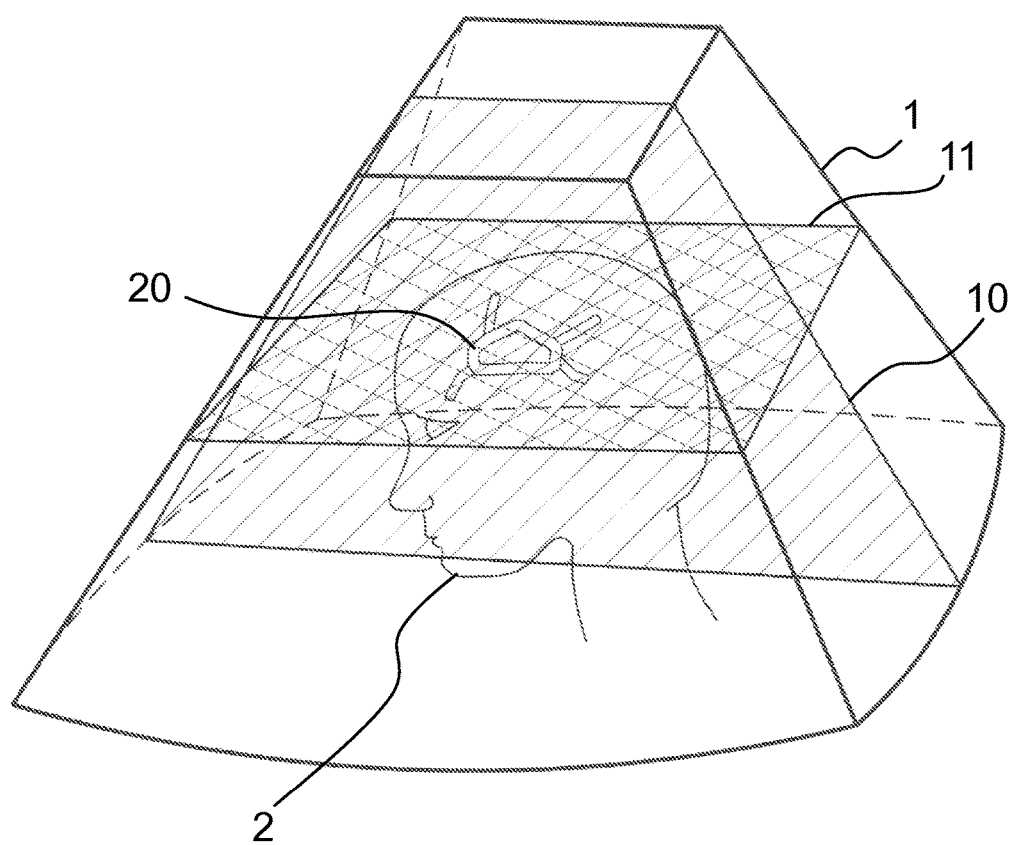
FIG. 1 is an acquisition diagram.

FIG. 1 shows the fetal head 2 comprised within the imaging volume of the 3D US probe, that is of the real-time image 1.

In the acquired 3D real-time image 1 two planes are identified, a scanning plane 10 and a registration plane 11.

Figure 2:
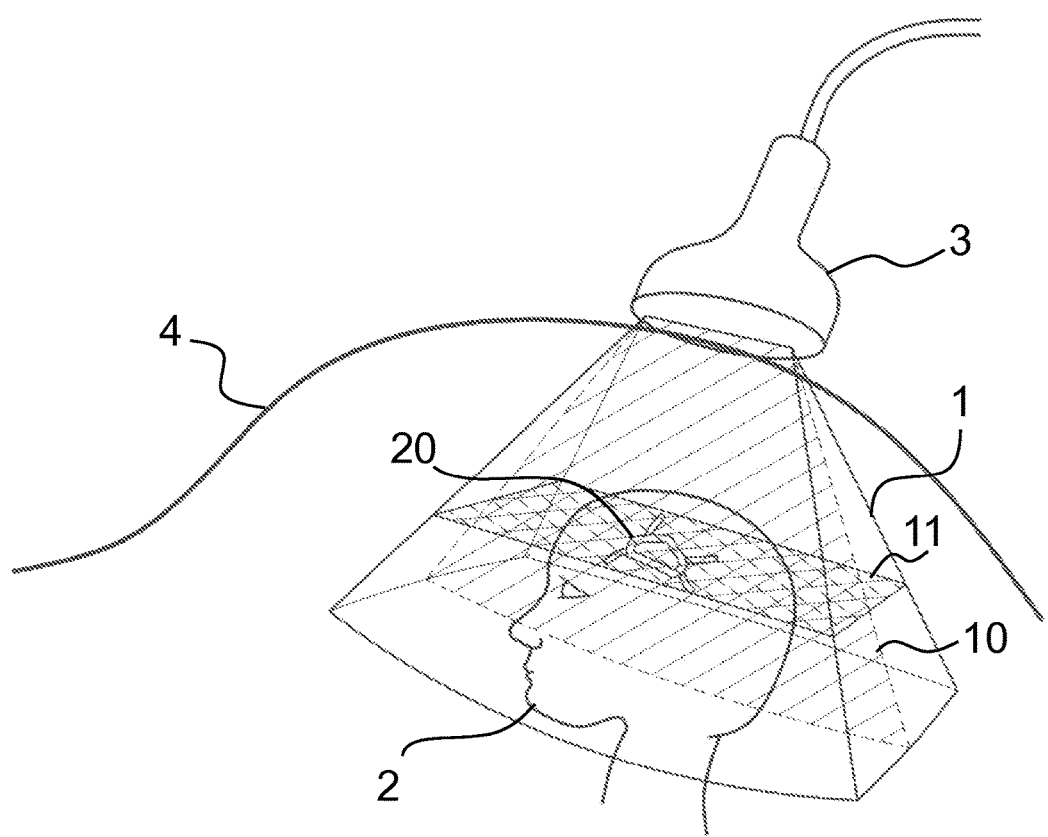
FIG. 2 is a schematic view of the whole scanning environment.

The scanning plane 10, in the example of the figure, is a tomographic plane substantially parallel to the sagittal plane of the fetal head 2 and to the direction of emission of the ultrasound pulses by the ultrasound probe 3, visible in FIG. 2.

The slice of real-time image 1 identified by the scanning plane 10 is fused with the corresponding slice of the pre-acquired image, for being displayed.

The registration plane 11 in the example in the figure is substantially parallel to a coronal plane of the fetal head and it is the plane identified by the selected anatomical markers of the fetal head, particularly in this example by the Circle of Willis.

The anatomical markers such as the Circle of Willis 20 are detected by ultrasound Color Doppler acquisition, and information are used for finding the corresponding structure in the pre-acquired image, such to perform a continuous registration in background.

As an alternative it is possible to use plane wave acquisition techniques that allow the frame rate to be kept high.

FIG. 2 shows the complete acquisition environment, with the fetal head 2, the mother's belly 4 and the ultrasound probe resting on the mother's belly 4.

The 3D ultrasound probe insonificates the area of interest and therefore the fetal head 2. Moreover the scanning plane 10 and the registration plane 11, placed along the Circle of Willis 20 of the fetus are visible.

Figure 3:
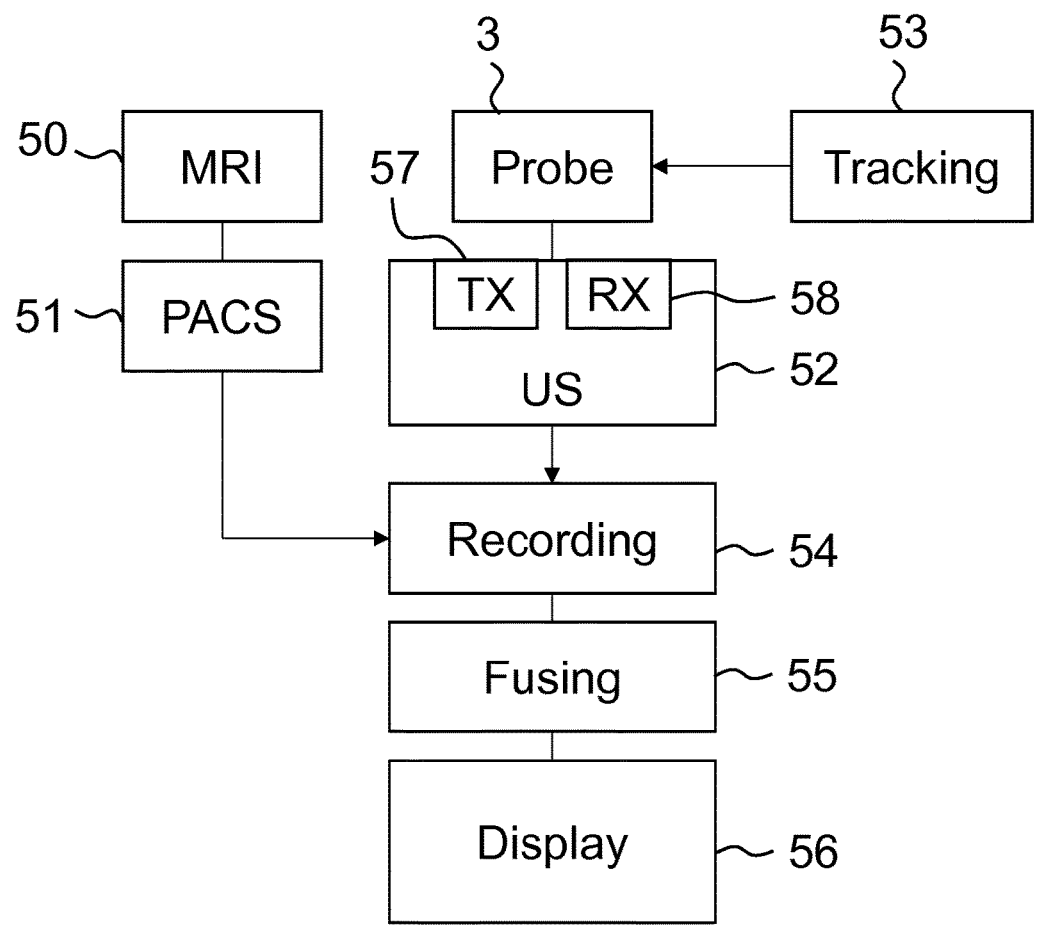
FIG. 3 is a diagram of the device.

FIG. 3 shows a diagram of the device of the present invention, comprising a 3D ultrasound probe 3 provided with one or more electroacoustic transducers, an ultrasound acquisition system 52 comprising a unit 57 transmitting an ultrasonic beam through the transducers within the body under examination and a unit 58 receiving and processing ultrasound signals received from the transducers for generating real-time images, and a probe tracking system 53.

The device receives pre-acquired images, typically MRI ones 50, from an image storage system, such as PACS 51 connected within a network with the device, or any storage and memory support such hard disk, CD/DVD, USB memory or the like. MRI images are preferably DICOM images.

There are provided means for the registration of an acquired real-time ultrasound image 1 with a pre-acquired image, for combining the coordinate system of the body under examination, the coordinate system of the probe and the coordinate system of the pre-acquired image into a single coordinate system, which registration means operate in real-time for each or some real-time images.

There are provided means 55 for the fusion of the real-time image with the registered pre-acquired image, particularly along the scanning plane visible in FIGS. 1 and 2, and means 56 displaying a sequence of fusion images, each fusion image comprising the corresponding real-time image and the pre-acquired image.

Figure 4:
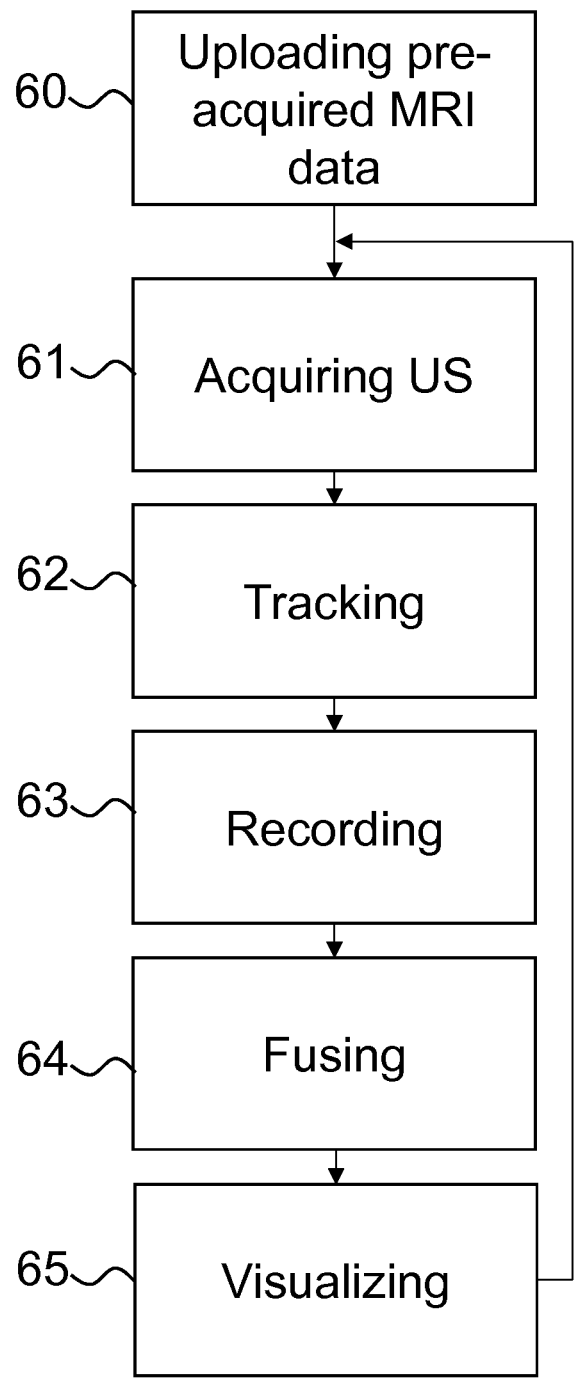
FIG. 4 is an operating chart of the method.

FIG. 4 shows a flow chart of the method of the present invention.

Firstly the pre-acquired MRI data 60 are loaded, then the acquisition 61 of a sequence of real-time ultrasound images starts.

Contemporaneously with the real-time acquisition 61, a detection 62 of the position and of the orientation of the ultrasound probe 3 for each acquired image is performed.

Therefore the registration 63 of the acquired real-time image with the pre-acquired image is performed, for combining the coordinate system of the patient, the coordinate system of the probe and the coordinate system of the pre-acquired image into a single coordinate system.

The registration 63 comprises the identification of a registration plane 11, visible in FIGS. 1 and 2, passing by the selected markers, composed of an object or a pattern and for example, particularly by the Circle of Willis 20 in the fetal head 2.

The markers are identified by the Color Doppler or Power Doppler modality, and a similar segmentation is carried out on the pre-acquired MRI image. The matching between the markers in the two acquisition modalities is found and the registration is performed.

Once the real-time image and the pre-acquired image are registered, a fusion 64 of the two images is performed, particularly limited to the scanning plane 10, visible in FIGS. 1 and 2.

Therefore the scanning plane 10 obtained in this manner is displayed, obtaining a display 65 of a sequence of fusion images, each fusion image comprising the corresponding real-time image and pre-acquired image.

The procedure is repeated, such as denoted in the figure by the feedback arrow, and thus the registration is performed in real-time for each real-time image.

However it is possible to limit the registration only to some real-time images, for example each predetermined number of acquired real-time images or only when a movement of the fetal head 20 is detected.

According to a further improvement characteristic of the invention, since it is possible that between the previous acquisition of the 3D image and the acquisition of real-time ultrasound images a given time interval has elapsed, even a quite long one, during which the fetus for example has undergone a given size growth, there is provided a method step consisting in the size adaptation of at least the object or pattern or reference markers used for the registration.

This step provides to combine a segmentation of said reference pattern or object and the use of size adaptation rules composed of functions operating on one or more data selected among the following ones: pregnancy trimester, gender, race and growth curve/tendency of the examined fetus, which size adaptation rules are composed of algorithms for predicting the fetus growth in said time period elapsed between the two image acquisitions.

Therefore the size adaptation algorithm can perform a size adaptation both for the first registration process, and for the fusion process and also for the continuous and automatic process maintaining the registration.

The invention claimed is:

1. A method of fusing ultrasound images with pre-acquired images, comprising the following steps:
   a) acquiring a first 3D ultrasound image in real-time;
   b) identifying at least one known reference pattern or object within a pre-acquired 3D image and the first 3D ultrasound image;
   c) registering the first 3D ultrasound image acquired in real-time with the pre-acquired 3D image by using the at least one known reference pattern or object;
   d) fusing 3D ultrasound images of a sequence of first 3D ultrasound images acquired in real-time with the pre-acquired 3D image by using data of a co-registration between said 3D ultrasound images and the pre-acquired 3D image; and
   e) displaying fusion tomographic images, each fusion image comprising a corresponding 3D ultrasound image acquired in real-time and the pre-acquired 3D image,
   wherein the co-registration between the 3D ultrasound images and the the pre-acquired 3D image is performed in a continuous manner in a background, by continuing to acquire, in the background, 3D ultrasound images and to register said 3D ultrasound images with the pre-acquired images by using said at least one known reference pattern or object,
   further comprising the following steps:
   identifying in the pre-acquired 3D image a volume or section plane comprising the at least one known reference pattern or object therein;
   acquiring at least one 3D ultrasound image by a quick acquisition and identifying, inside the at least one 3D ultrasound image, the at least one known reference pattern or object;
   performing a registration of the at least one 3D ultrasound image with the pre-acquired 3D image based on the at least one known reference pattern or said object;
   defining a plane or volume corresponding to a view of an object or to an anatomical district to be examined within at least one 3D ultrasound image acquired and in the pre-acquired 3D image registered with each other, the plane or volume not coinciding with the volume or section plane containing the at least one known reference pattern or object for performing the registration of the at least one 3D ultrasound image with the pre-acquired 3D image;
   continuing with acquisition of a 3D ultrasound image and reconstruction of a real-time ultrasound image in said plane or in said volume corresponding to the view of an object or to an anatomical district to be examined and performing a fusion with a corresponding image along said plane or in said volume of the pre-acquired 3D image; and
   continuing with the acquisition, in the background, of image data of the 3D ultrasound images and using, in the background, information or data of the 3D ultrasound images acquired in real-time to maintain the registration between the 3D ultrasound images with the pre-acquired images, wherein the registration between the 3D ultrasound images with the pre-acquired images is maintained by continuing to perform, in the background, a registration process for each 3D ultrasound image and the pre-acquired images by using the volume or section plane comprising the at least one known reference pattern or object therein.

2. The method according to claim 1, wherein the sequence of first 3D ultrasound images acquired in real-time and the 3D ultrasound images acquired in the background comprise both imaging data and Doppler data, the Doppler data containing ultrasound information obtained by one or more techniques selected from the group consisting of Color Doppler, Power Doppler, or Color Coded Doppler, and by using said techniques individually or combined for a continuous co-registration with the same at least one known reference pattern or object identified in the pre-acquired 3D image.

3. The method according to claim 1, wherein the pre-acquired 3D image is a 3D image and said sequence of first 3D ultrasound images are 3D ultrasound images.

4. The method according claim 1, wherein the fusion tomographic images are 2D images and comprise a view of a real-time image along a predetermined scanning plane and a corresponding view, reconstructed based on the co-registration, of the pre-acquired 3D image.

5. The method according to claim 4, wherein the co-registration is performed by identifying, as the at least one known reference pattern or object, a plurality of markers lying on a registration plane of the pre-acquired 3D image and by identifying corresponding markers in the first 3D ultrasound image.

6. The method according to claim 5, wherein the markers are blood vessels.

7. The method according to claim 1, further comprising the step of performing at least one first quick acquisition of a 3D ultrasound image and an automatic registration algorithm operating in the background, and performing a fusion based on blood vessels of a brain shown by magnetic resonance with hemodynamic 3D Doppler information of the brain.

8. The method according to claim 1, wherein 3D ultrasound acquisition in real-time is performed with plane wave transmission/imaging techniques.

9. The method according to claim 1, wherein the step of registering the first 3D ultrasound imam acquired in real-time with the pre-acquired 3D image comprises an assessment and a consequent adaptation of size change of one or more anatomical structures between a time of pre-acquired image acquisition and time of real-time image acquisition.

10. The method according to claim 1, wherein a region of interest is a fetal head and the at least one known reference pattern or object is a bone structure of the skull or the Circle of Willis of the fetal head.

11. The method according to claim 1, wherein the step of acquiring the first 3D ultrasound image is performed with a probe having a two-dimensional array of transducers.

* * * * *